United States Patent
Svoboda et al.

(10) Patent No.: US 9,994,725 B2
(45) Date of Patent: *Jun. 12, 2018

(54) ELECTRICALLY CONDUCTIVE INK AND USES THEREOF

(71) Applicant: CFD Research Corporation, Huntsville, AL (US)

(72) Inventors: Vojtech Svoboda, Huntsville, AL (US); Jianjun Wei, Huntsville, AL (US); Sameer Singhal, Huntsville, AL (US); Yevgenia Ulyanova, Huntsville, AL (US)

(73) Assignee: CFD Research Corporation, Inc., Huntsville, AL (US)

( * ) Notice: Subject to any disclaimer, the term of this patent is extended or adjusted under 35 U.S.C. 154(b) by 341 days.

This patent is subject to a terminal disclaimer.

(21) Appl. No.: 14/198,035

(22) Filed: Mar. 5, 2014

(65) Prior Publication Data

US 2014/0183416 A1     Jul. 3, 2014

Related U.S. Application Data

(63) Continuation of application No. 13/155,811, filed on Jun. 8, 2011, now Pat. No. 8,703,022.

(51) Int. Cl.
  *C09D 11/52*   (2014.01)
  *B82Y 30/00*   (2011.01)

(52) U.S. Cl.
  CPC .............. *C09D 11/52* (2013.01); *B82Y 30/00* (2013.01)

(58) Field of Classification Search
  CPC ............ C09D 11/52; B82Y 30/00; H01B 1/00
  (Continued)

(56) References Cited

U.S. PATENT DOCUMENTS 6,939,451 B2    9/2005  Zhao et al.
2004/0262582 A1*  12/2004  Kirkor ................... B82Y 10/00
                                              252/500

(Continued)

FOREIGN PATENT DOCUMENTS

WO    2007/013872 A2    1/2007
WO    2008/085199 A2    7/2008

OTHER PUBLICATIONS

Development of a printable enzymatic fuel cell mediated by organic and transition metal-based redox species; 213th ECS Meeting, Abstract #229, Jenkins et al.

(Continued)

*Primary Examiner* — Harold Pyon
*Assistant Examiner* — Danny N Kang
(74) *Attorney, Agent, or Firm* — Jeremy A. Smith; Bradley Arant Boult Cummings LLP

(57) ABSTRACT

The present disclosure provides an aqueous based electrically conductive ink, which is essentially solvent free and includes a nano-scale conducting material; a binding agent; and an enzyme. In one embodiment, the ink includes at least one of a mediator, a cross-linking agent and a substrate as well. In one further embodiment, the present disclosure provides electrically conductive ink including a single walled, carboxylic acid functionalized carbon nanotube; 1-Ethyl-3-[3-dimethylaminopropyl]carbodiimide hydrochloride and N-hydroxy succinimide (NHS) ester; polyethyleneimine; an aqueous buffer; and glucose oxidase.

27 Claims, 6 Drawing Sheets

(58) Field of Classification Search
USPC ................... 252/510, 519.21, 519.32, 500
See application file for complete search history.

(56) References Cited

U.S. PATENT DOCUMENTS

| | | |
|---|---|---|
| 2005/0186333 A1 | 8/2005 | Douglas |
| 2006/0021881 A1 | 2/2006 | Soundarrahan et al. |
| 2006/0226008 A1* | 10/2006 | Rodgers ................. C12Q 1/004 204/403.14 |
| 2007/0131546 A1 | 6/2007 | Nomoto et al. |
| 2007/0131547 A1 | 6/2007 | Nomoto et al. |
| 2008/0023327 A1 | 1/2008 | Douglas |
| 2008/0097280 A1 | 4/2008 | Martin et al. |
| 2008/0248354 A1 | 10/2008 | Kubo et al. |
| 2009/0084678 A1 | 4/2009 | Joshi et al. |
| 2009/0280408 A1* | 11/2009 | Valkiainen .......... H01M 4/9008 429/212 |
| 2010/0041123 A1 | 2/2010 | Minteer et al. |
| 2011/0196216 A1 | 8/2011 | Quarder et al. |

OTHER PUBLICATIONS

On the use of screen—and ink-jet printing to produce amperometric enzyme electrodes for lactate; Biosensors and Bioelectronics, vol. 11, No. 3, pp. 263-270, 1996, Hart and Turner.
Biofuel cells—Recent advances and applications; Biosensors and Bioelectronics, vol. 22, available online Jun. 16, 2006, Davis and Higson.
Electrochemical sensors based on conducting polymer-polypyrrole, Electrochimica Acta vol. 51, available online May 6, 2006, Ramanavicius et al.
Abstract, Conducting polymer coated carbon surfaces and biosensor applications; Progress in Organic Coatings, vol. 66, issue 4, pp. 337-358, Dec. 2009, Ates and Sarac.
Abstract; Soluble functionalized carbon nanotube/poly(vinyl alcohol) nanocomposite as the electrode for glucose sensing, Smart Materials and Structures, vol. 15, Issue 1, pp. 123-128, Feb. 2006. Zhang et al.
Abstract, A glucose oxidase electrode based on electropolymerized conducting polymer with polyanion-enzyme conjugated dopant; Analytical Chem., vol. 72, Issue 9, pp. 2177-2181, Sung and Bae.
A one-compartment, direct glucose fuel cell for powering long term medical implants; MEMS, Jan. 2006, von Stetten et al.
Integrated microfluidic devices; Analytica Chimica Acta, 507 (2004) 11-26, Erickson and Li.
Development of a printable laccase based biocathode for fuel cell applications; Enzyme and Microbial Technology, 43 (2008) 93-102, Smolander et al.
Complete oxidation of glycerol in an enzymatic biofuel cell; Fuel Cells 2009, No. 1, pp. 63-69, Arechederra and Minteer.
Oxygen-reducing enzyme cathodes produced from SLAC, a small lacasse from Streptomyces coelicolor, Biosensors and Bioelectronics, 23 (2008), 1229-1235, Gallaway et al.
Recent advances in material science for developing enzyme electrodes; Biosensors and Bioelectronics, 2008, Sarma et al.
Screen-printed tyrosinase containing electrodes for the biosensing of enzyme inhibitors; Talanta 43 (1996), 1903-1907, Wang et al.
Biosensors based on carbon nanotubes; Ana. Bioanal. Chem. (2006) 385:452-468, Balasubramanian.
Handbook of Fuel Cells; Chapter 8, Enzyme catalysis in biological fuel cells, Barton.
Functionalized single wall carbon nanotubes/polypyrrole composites for the preparation of amperometric glucose biosensors; J. Mater. Chemistry, 2004 (14) 807-810, Callegari et al.
Abstract, Probing enzyme polymer biosensors using x-ray photoelectron spectroscopy: determination of glucose oxidase in electropolymerised films; Biosensors and Bioelectronics, vol. 11, Issues 6-7, pp. 625-631, available online Sep. 1998, Griffith et al.
Abstract, Direct electrochemistry of glucose oxidase on screen-printed electrodes through one-step enzyme immobilization process with silica sol-gel/polyvinyl alcohol hybrid film; Sensors and Actuators B: Chemical, vol. 133, Issue 2, Aug. 2008, pp. 555-560, Zuo et al.
Abstract, Stabilization of an osmium bis-bipyridyl polymer-modified carbon paste amperometric glucose biosensor using polyethyleneimine; Electroanalysis, vol. 9, Issue 13, pp. 978-984, Apr. 2005, Jezkova et al.
Abstract, Polyethyleneimine-coated reticulated vitreous carbon electrode with immobolized enzymes as substrate detector; Analytica Chimica Acta, vol. 374, Issues 2-3, pp. 185-190, available online Nov. 1998, Tang et al.
Enzyme sensors based on an ion-sensitive field effect transistor coated with langmuir-blodgett membranes. Use of polyethyleneimine as a spacer for immobilizing x-Chymotrypsin; Chem. Pharm. Bull., 37(12) 3320-3322 (1989), Anzai et al.
Enzyme based amperometric biosensors for food analysis; Electroanalysis 2002, 14, vol. 4, Prodromidis and Karayannis.
A polypyrrole/three-enzyme electrode for creatinine detection; Anal. Chem. 1995, 67, 2776-2780, Yamato et al.
Carbon nanotube/polysulfone composite screen-printed electrochemical enzyme biosensors; The Analyst, 2007, 132, 142-147, Sanchez et al.
Highly conducting carbon nanotube/polyethyleneimine composite fibers; Adv. Mater. 2005, 17, No. 8, Apr. 18, Munoz et al.
Development of enzyme catalyzed electrodes for printable fuel cell applications; 213th ECS Meeting, Abstract #224, The Electrochemical Society, Smolander et al.

* cited by examiner

FIG. 2A and 2B
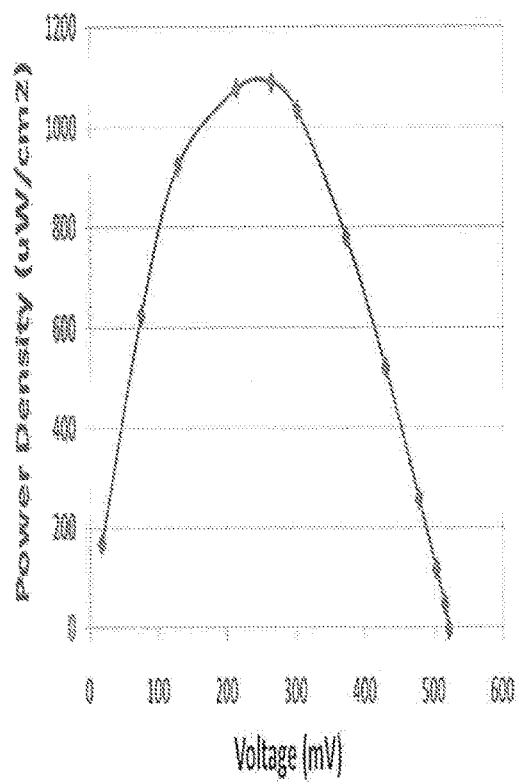
FIG. 2A
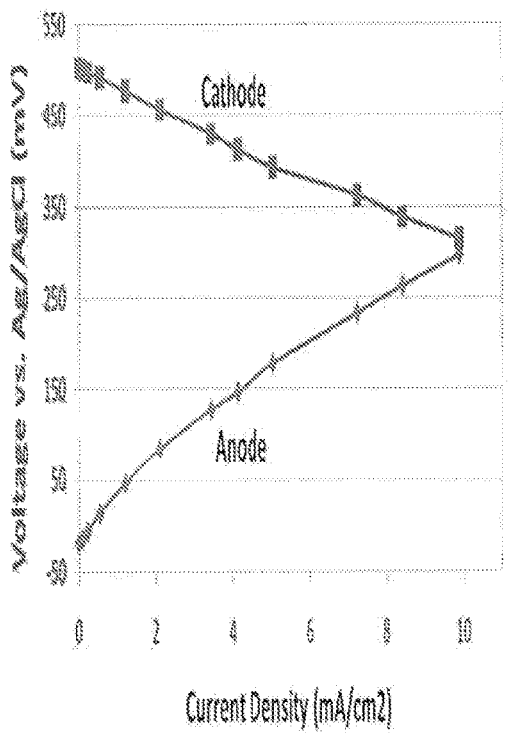
FIG. 2B

ELECTRICALLY CONDUCTIVE INK AND USES THEREOF

CROSS REFERENCE TO OTHER APPLICATIONS

This application is a continuation of and therefore claims priority to, and the benefit of, currently pending U.S. patent application Ser. No. 13/155,811 filed Jun. 8, 2011, entitled "Electrically Conductive Ink and Uses Thereof."

STATEMENT REGARDING FEDERALLY SPONSORED RESEARCH OR DEVELOPMENT

The research and inventions disclosed herein were funded at least in part by funds received from the U.S. Department of the Army pursuant to SBIR contract numbers W15P7T-06-C-T203 and W15P7T-09-C-S623.

FIELD OF THE DISCLOSURE

The present disclosure pertains to the field of power generation and more particularly to electrically conductive inks for use in power generation. More specifically, the present disclosure pertains to an electrically conductive ink capable of operating at elevated temperatures. Uses of such electrically conductive inks and devices incorporating the same are also provided.

BACKGROUND

Electrically conductive inks containing enzymes are known in the art. In many cases, these inks use either bio-molecules, such as enzymes, or even whole living organisms to catalyze oxidation of substrates, such as alcohols and carbohydrates to release electrons and generate electrical energy. Despite substantial research in the field, the prior art inks are often extremely difficult to reliably produce and are extremely temperature sensitive. These factors have restricted the use and applications of such electrically conductive inks. Therefore, the art is in need of improved electrically conductive inks with improved properties, such as, but not limited to, ease of manufacture and temperature stability.

The present disclosure provides a solution to this long-felt need. The present disclosure provides an improved electrically conductive ink with the surprising electrical conductivity properties at elevated temperatures. Such a novel feature has not been previously disclosed in the art.

BRIEF DESCRIPTION OF THE DRAWINGS

FIG. 2A show a graph of power density vs. voltage of one embodiment of the ink used in a fuel cell. FIG. 2B shows a graph of voltage vs. current density of one embodiment of the ink used in a fuel cell.

SUMMARY OF THE DISCLOSURE

Figure 1:
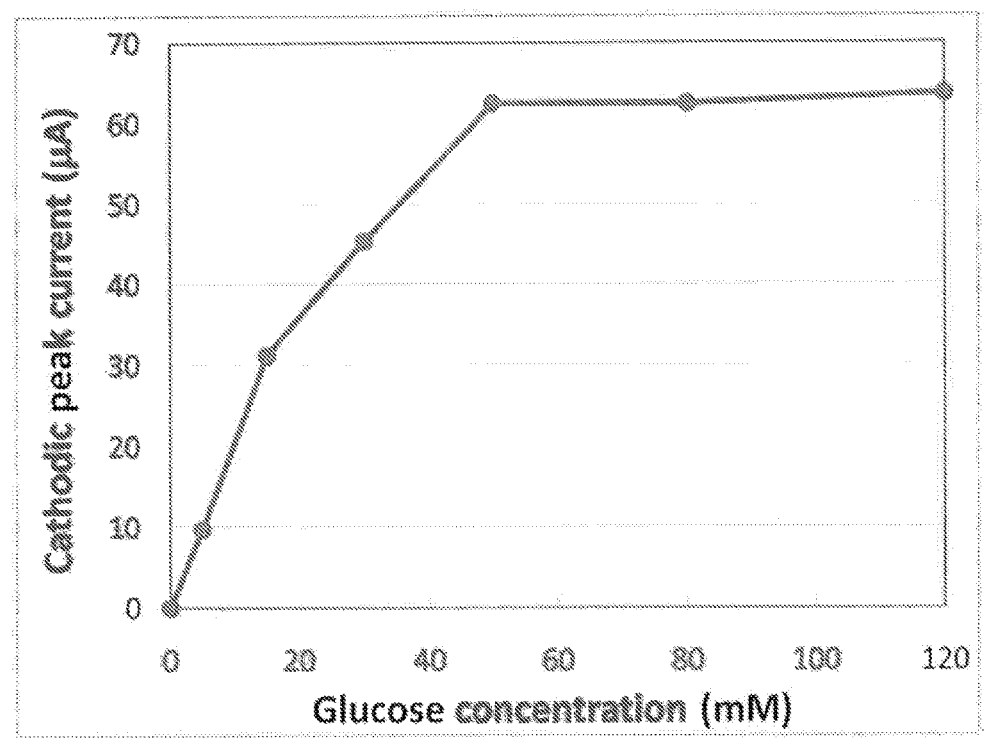
FIG. 1 shows one embodiment of the ink and the cathodic peak current thereof on increasing glucose concentrations.

In a first aspect, the present disclosure provides an electrically conductive ink exhibiting superior retention of electrical conductivity and biocatalytic activity of embedded enzymes at elevated temperatures. In one embodiment of this aspect, the electrically conductive ink consists of, consists essentially of or comprises a nano-scale conducting material, a binding agent and one or more enzymes, and is essentially solvent free. The electrically conductive ink may further comprise additional components, including, but not limited to, a mediator and a cross-linking agent. In a second aspect, the present disclosure provides an aqueous based electrically conductive ink consisting of, consisting essentially of or comprising a nano-scale conducting material, a binding agent and one or more enzymes, wherein the ink is essentially solvent free. The electrically conductive ink may further comprise additional components, including, but not limited to, a mediator and a cross-linking agent. In a particular embodiment, the electrically conductive ink exhibits superior retention of electrical conductivity and biocatalytic activity at elevated temperatures.

In one embodiment of this aspect, the electrically conductive ink exhibits superior retention of electrical conductivity at elevated temperatures.

In a third aspect, the present disclosure provides an electrically conductive ink, existing in a first form and a second form, wherein the first form is a water-soluble aqueous based solution which consists of consists essentially of or comprises a nano-scale conducting material, a binding agent, an aqueous buffer and one or more enzymes and the second water insoluble form is generated from the first form and consists of, consists essentially of or comprises the nano-scale conducting material, the binding agent and the one or more enzymes. The electrically conductive ink, in either or both of the first or second forms, may further comprise additional components, including, but not limited to, a mediator and a cross-linking agent. Furthermore, the electrically conducting ink may be essentially solvent free. In one embodiment of this aspect, the electrically conductive ink exhibits superior retention of electrical conductivity and biocatalytic activity at elevated temperatures and is essentially solvent free.

In a fourth aspect, the present disclosure provides a fuel cell comprising an electrode material, the electrode material further comprising an electrically conductive ink of the first through third embodiments deposited on said electrode.

DETAILED DESCRIPTION

Composition

In one embodiment, the present disclosure provides an electrically conductive ink exhibiting superior retention of electrical conductivity and biocatalytic activity at elevated temperatures. In one embodiment of this aspect, the electrically conductive ink consists of, consists essentially of or comprises at least one of a nano-scale conducting material, a binding agent and one or more enzymes, and is essentially solvent free. The electrically conductive ink may further comprise additional components, including, but not limited to, a mediator and a cross-linking agent.

In another embodiment, the present disclosure provides an aqueous based electrically conductive ink consisting of, consisting essentially of or comprising a nano-scale conducting material, a binding agent and one or more enzymes, wherein the ink is essentially solvent free. The electrically conductive ink may further comprise additional components, including, but not limited to, a mediator and a cross-linking agent. In a particular embodiment, the electrically conductive ink exhibits superior retention of electrical conductivity and biocatalytic activity at elevated temperatures.

In still a further embodiment, the present disclosure provides an electrically conductive ink, existing in a first form and a second form, wherein the first form is a water-soluble aqueous based solution which consists of, consists essentially of or comprises a nano-scale conducting material, a binding agent, an aqueous buffer and one or more enzymes and the second water insoluble form is generated from the first form and consists of, consists essentially of or comprises the nano-scale conducting material, the binding agent and the one or more enzymes. The electrically conductive ink, in either or both of the first or second forms, may further comprise additional components, including, but not limited to, a mediator and a cross-linking agent. Furthermore, the electrically conducting ink may be essentially solvent free. In a specific embodiment, the electrically conductive ink exhibits superior retention of electrical conductivity and biocatalytic activity at elevated temperatures and is essentially solvent free.

In a specific embodiment, the electrically conductive inks described above incorporate a cross-linking agent. In a further specific embodiment, the electrically conductive inks described above incorporate a mediator. In still a further embodiment, the electrically conductive inks described above incorporate a cross-linking agent and a mediator.

In embodiments of the foregoing where the mediator is not present in the electrically conductive ink, the mediator may be present in a fluid solution surrounding the electrically conductive ink. In one embodiment, the mediator is present in a fluid solution surrounding the electrically conductive ink.

In this embodiment, the first form of the electrically conductive ink of the present disclosure is characterized as a water-soluble aqueous based solution consisting of consisting essentially of or comprising: a nano-scale conducting material, a binding agent, an aqueous buffer and one or more enzymes. The first form may further comprise a mediator and a cross-linking agent. The second form of the electrically conductive ink is characterized as a water insoluble matrix consisting of, consisting essentially of or comprising the nano-scale conducting material, the binding agent and the one or more enzymes. In this embodiment, the second form may be generated from the first form by curing the ink for a period of time. Other methods known in the art may also be used. In one embodiment, the second form is generated from the first form by self curing the electrically conductive ink on a conductive electrode surface at about 4 degrees Celsius. The first form and or the second form may further comprise a mediator and a cross-linking agent In the embodiments of the electrically conductive ink described herein, the electrically conductive ink exhibits increased retention of electrical conductivity and biocatalytic activity at increased temperatures when compared to prior art electrically conductive inks. For example, the electrically conductive ink retains significant electrical conductivity and biocatalytic activity at temperatures above 40 degrees Celsius or above 50 degrees Celsius as compared to prior art ink. In a particular embodiment, the electrically conductive inks of the present disclosure retain 75%, 80%, 85%, 90%, 95%, or greater of their electrical conductivity and biocatalytic activity while operating or being stored at increased temperatures (such as over 40 and 55 degrees Celsius) as compared to 22 degrees Celsius.

In the embodiments of the electrically conductive ink, including the first and second forms thereof, described herein the electrically conductive ink incorporates a nano-scale conducting material. In one embodiment, the first form and second form of the electrically conductive ink comprises a nano-scale conducting material. The nano-scale conducting material may serve several functions including, but not limited to, providing a large surface area to volume for charge transfer rations that increase the electrode's total biocatalytic reaction rates, immobilizing and stabilizing the enzyme, and facilitating efficient electron transfer from the enzyme directly to the cathode or anode, and or from the enzyme to the mediator and from mediator to cathode or anode. In one embodiment, the nano-scale conducting material is a carbon nanotube (CNT). CNTs are cylinder (or tube) shaped molecules of graphitic carbon that have remarkable electronic properties and many other unique characteristics. In yet a further embodiment of the present disclosure, the CNT may either be a single walled or multi-walled CNT. Single walled CNTs comprise a single rolled layer of graphite carbon while multi-walled CNTs comprise multiple rolled layers (or concentric tubes) of graphite. In yet a further embodiment, the single- or multi-walled CNT may be functionalized. Functionalized CNTs have additional chemical molecules or functional groups attached to their sidewalls and display increased solubility in aqueous liquids and polymer resins as compared to non-functionalized CNTs. In one further embodiment, the CNT has been functionalized by the addition of a carboxylic acid (COOH) group, however functionalization with other groups including without limitation hydroxyl (OH), amines (NH2), bromine (Br), and others including larger biomolecules are possible and should be considered within the scope of this invention.

In the embodiments of the electrically conductive ink, including the first and second forms thereof, described herein the electrically conductive ink incorporates a binding agent. The binding agent is miscible or soluble in aqueous solutions. The binding agent serves to immobilize the nano-scale conductive material, the one or more enzymes and other components of the ink. The binding agent may be any suitable agent as selected by one skilled in the art and may include polymers and other suitable compounds. In one embodiment, the water miscible binding agent is polymer. In one embodiment, the polymer is a cationic polymer, such as, but not limited to, polyethyleneimine (PEI) polymer.

In the embodiments of the first form of the electrically conductive ink described herein the electrically conductive ink incorporates an aqueous buffer. In one embodiment, the aqueous buffer is potassium phosphate buffered saline (PBS) of concentration range of 5 mM to 1 M. In alternate embodiments, the aqueous buffer may be (4-(2-hydroxyethyl)-1-piperazineethanesulfonic acid) (HEPES), N-Tris (hydroxymethyl)methyl-3-aminopropanesulfonic, Acid (TAPS), N,N-Bis(2-hydroxyethyl)glycine (Bicine), (hydroxymethyl)aminomethane (TRIS), N-[Tris(hydroxymethyl)methyl]glycine, 3-[(3-Cholamidopropyl) dimethylammonio] propanesulfonic acid (Tricine), N-Tris (hydroxymethyl)methyl-2-aminoethanesulfonic Acid (TES), 3-(N-morpholino)propanesulfonic acid (MOPS), 2-[4-(2-sulfoethyl)piperazin-1-yl]ethanesulfonic acid (PIPES), 2-(N-morpholino)ethanesulfonic acid (MES) or cacodylate.

In the embodiments of the electrically conductive ink, including the first and second forms thereof, described herein the electrically conductive ink incorporates an enzyme. In certain embodiments, more than one enzyme may be present. In one embodiment the enzyme may be a single oxidoreductase enzyme capable of oxidizing or reducing a substrate to release or consume electrons which may then be used to create an electric potential/current. As is known to those skilled in the art, oxidoreductase enzymes may be oxidases, dehydrogenases or hydrogenases. In one embodiment, the oxidoreductase enzyme is an oxidase which is capable of oxidizing a carbohydrate substrate. By way of non-limiting example, in one particular embodiment the oxidase enzyme may glucose oxidase. In yet a further embodiment, the oxidoreductase enzyme may be dehydrogenase such as pyrrolo-quinoline-quinone (PQQ) glucose dehydrogenase. D-fructose-5-dehydrogenase, glucose dehydrogenase, alcohol dehydrogenase, gluconate 2-dehydrogenase, laccase, bilirubin oxidase, ascorbate oxidase, aldehyde dehydrogenase, oxalate oxidase, malate dehydrogenase, succinate dehydrogenase, pyruvate dehydrogenase, glutamate dehydrogenase, isocitrate dehydrogenase, or lactase dehydrogenase. As will be realized by one skilled in the art, the choice of one or more enzymes may be influenced by the substrate upon which the one or more enzymes act, the availability of substrate and other concerns such as the desired operating environment of the electrically conductive ink. In one embodiment of the present disclosure, the substrate may be a simple or complex carbohydrate, such as, but not limited to, glucose, fructose, sucrose, trehalose, glycerol, or an alcohol, such as, but not limited to, methanol or ethanol. Other substrates include ethylene glycol, diethylene glycol, polyethylene glycol, diol, potentially cellulose, JP8 fuel, methane, butane and other. In a particular embodiment, the enzyme is glucose oxidase.

In yet an alternate embodiment of the present invention, the electrically conductive ink may contain two or more enzymes. In one embodiment, the two or more enzymes may be part of an enzyme cascade. Enzymes that are capable of releasing or consuming a proton/electron in oxidation or reduction reaction respectively generate an electric current/potential. An enzyme cascade might also contain non-electric current/potential enzymes that function as catalysis for chemical reaction transforming a first substrate or byproduct to a second substance that can be used with the electric current/potential generating enzymes. In one embodiment, the two or more enzymes may both be electric current/potential generating enzymes and may be selected so that the reaction product of one enzymatic reaction may be the substrate for the other enzymatic reaction. As those skilled in the art will realize, and by way of non-limiting example, the two or more enzymes may include two enzymes selected from the enzymes involved in the Kreb's Cycle (also known as the citric acid cycle) involved in aerobic respiration or invertase (also known as sucrase) and glucose oxidase for the hydrolysis of sucrose.

In the embodiments of the electrically conductive ink, including the first and second forms thereof, described herein the electrically conductive ink incorporates a mediator. The mediator may be any compound that can assist in the transfer of electrons from the substrate to the nano-scale conductive material and conductive electrode surface or which can directly or indirectly increase the efficiency of the oxidation of the substrate by the one or more enzymes. In one embodiment, the mediator may be hydroquinone (HQ), ferrocene or ferricyanide. In yet another embodiment, the mediator may be an osmium containing compound. In yet an alternate embodiment, the mediator may be an azine containing compound such as methyl blue or methyl green. In yet another alternate embodiment, the mediator may be flavin adenine dinucleotide (FAD), nicotinamide adenine dinucleotide (NAD), pyrrolo-quinoline-quinone (PQQ), TTF or osmium based hydrogels. As known to those skilled in the art, the selection of mediator will be influenced by the one or more enzymes present in the electrically conductive ink and the substrate upon which those enzymes act.

In the embodiments of the electrically conductive ink, including the first and second forms thereof, described herein the electrically conductive ink incorporates a cross-linking agent. The cross-linking agent functions to assist the transition of the first from of the electrically conductive into the second from. As known to those skilled in the art, the selection of cross-linker may be dependent upon the selection of the binding agent or one or more enzymes and other factors. By way of non-limiting example, the cross-linker may be 1-Ethyl-3-[3-dimethylaminopropyl]carbodiimide hydrochloride (EDC), a N-hydroxy succinimide (NHS) ester, lysozyme, Dithiobis[succinimidyl propionate (DSP), dithiobis(N-succinimidyl propionate) (DTSP) and potentially others. In one embodiment, the cross-linking agent is EDC, NHS or a combination of the two.

In yet another embodiment, the electrically conductive ink further comprises a monomer of an electrically conductive polymer and an electrolyte. The electrically conductive polymer may be polypyrrole (PPY), polyaniline (PANI), polyacetylene (PAC), poly(p-phenylene vinylene) (PPV) or any other suitable polymer known to those of skill in the art. A wide selection of electrolytes including ionic liquids might be used. The polymerization reaction might be facilitated with electropolymerization, chemical polymerization, or be also catalyzed with enzymes. In one preferred embodiment, lithium perchlorate ($LiClO_4$) is the electrolyte. As known to those skilled in the art, the selection of monomer of an electrically conductive polymer and an electrolyte may be dependent upon the selection of the one or more enzymes and other factors. By way of non-limiting example, the monomer of an electrically conductive polymer may be electrically polymerized pyrrole or aniline while the electrolyte comprises lithium perchlorate.

In a specific embodiment of the foregoing, the electrically conductive ink consists of, consists essentially of or comprises CNTs as the nano-scale conducting material, a binding agent a cross-linking agent and an enzyme. The CNTs May be single walled or multi-walled and may be functionalized with chemical molecules or functional groups attached thereto. In one embodiment, the CNT is a single wall CNT with COOH functional groups attached thereto. In such an embodiment, the enzyme, binding agent and cross-linking agent may be selected from those described herein. In one further embodiment of the foregoing, the enzyme is glucose oxidase, the binding agent is PEI and the cross-linking agent is a combination of EDC and NHS. Furthermore, the ink may be essentially solvent free.

Uses

The electrically conductive ink of the present disclosure has many uses. For example, the electrically conductive ink may be used as part of an electrode. The electrode may be used in a diverse range of applications, such as, for example, the construction of a fuel cell, a battery electrode or a sensor electrode. The fuel cell then may be used for powering remote monitors, surveillance devices, sensors (such as sensors capable of detecting chemical and/or biological weapons), in implantable medical devices or in the field as part of a battery recharging device to recharge batteries in crucial operations (such as on the battlefield by soldiers) when there is no supply electrical power, but a substrate source is available.

The fuel cell in one embodiment of the present disclosure uses the electrode comprising the electrically conductive ink as at least one of an anode or a cathode. In one embodiment, the electrode can be made into a plate-like or layer-like form, and used in a single layer. The fuel cell can include a reaction vessel capable of storing substrate and an anode and a cathode arranged in the reaction vessel, and the fuel cell electrode according to the present disclosure is used for at least one of the anode or the cathode. In one embodiment, the fuel cell electrode comprises a carbon-based electrode paper, such as Toray paper, Glassy Carbon planar gold surface, gold nanostructured surfaces, gold wire, carbon coated wire or carbon microfibers upon which the ink is deposited. In one embodiment, the carbon-based electrode paper comprises the anode of the fuel cell which is separated by a sulfonated tetrafluoroethylene based fluoropolymer-copolymer membrane, such as Nafion® (or any such other suitable proton conductive material) from the fuel cell's cathode. In one embodiment, the cathode is an oxygen reduction cathode that can be designed for an air breathing operation. In one embodiment, the oxygen reduction reaction in the cathode might be catalyzed by platinum (Pt), other precious metals, or their combination, or by bioelectrocatalysts like laccase, bilirubin oxidase, ascorbate oxidase and other enzymes. The cathode may comprise various chemistries that provide reduction reactions in which protons and electrons are consumed.

Advantages

The electrically conductive ink of the present disclosure has many surprising characteristics as compared to the known art. First, as discussed in Examples 3 and 7 shown by FIGS. 3A, 3B, 7A and 7B, the electrically conductive ink renders the one or more enzymes and other components of the ink much less sensitive to elevated temperatures (and long term storage at elevated temperatures) than the native enzyme and other electrically conductive inks of the prior art. This characteristic provides the ability for the electrically conductive ink, and devices incorporating the same, to be operable over a wider range of conditions than was previously possible. In addition, the electrically conductive ink of the present disclosure and devices incorporating the same can be stored under conditions that would inactivate prior art electrically conducting inks and devices depending on such inks, greatly simplifying use in real-world conditions. As shown by Examples 3 and 7, the electrically conductive ink retains conductivity and biocatalytic activity and the ability to produce electrical power after storage at an elevated temperature as compared to native enzyme. Further, a fuel cell comprising an electrode upon which the electrically conductive ink has been deposited is environmentally friendly as compared to traditional batteries and fuel cells. Finally, the theoretical energy density of a fuel cell comprising an electrode upon which the electrically conductive ink has been deposited is approximately ten (10) greater than lithium-ion batteries.

EXAMPLES

Example 1

To demonstrate the functionality the electrically conductive ink of the present disclosure, the ability of the electrically conductive ink to generate electrical current was tested. In this example, the electrically conductive ink comprised single wall COOH functionalized CNTs as the nanoscale conducting material, PEI as the binding agent, and glucose oxidase as the enzyme. To create the electrically conductive ink, the polymer was dissolved in a phosphate buffer solution by stirring in a ratio of 100-2000 ug/mL for several hours. After the solution was sufficiently mixed, CNTs were added to the mixture. In this example single-walled CNTs with COOH functionalization were utilized. The CNT ratio was between 1-50 mg/mL and the mixing was accomplished via sonication with an ultrasonicator. Next the enzyme and cross-linking agents are added to the solution. In this example, the cross linkers EDC and NHS were added along with the enzyme glucose oxidase. To construct the electrode, a small volume of the electrically conductive ink solution was pippetted onto a Toray paper electrode material. The electrode was allowed to cure overnight at approximately 4° Celsius.

The following day the Toray paper electrode was rinsed with phosphate buffer solution and then attached to a standard glassy carbon electrode for testing in 3-electrode cyclic voltamettry (CV) test. In this test the electrode comprising the electrically conductive ink serves as the working electrode, with a Ag/AgCl (3M KO) reference electrode and a platinum counter electrode. CV tests were performed from −0.8V to +0.8V with a scan rate of 10 mV/s. In order to test for biocatalytic activity of the enzyme immobilized in the ink, CV sweeps were done with increasing glucose concentrations of 0, 5, 15, 30, 50, 80, and 120 mM in a test solution of 245 mM phosphate buffer solution with 10 mM HQ added as an electron mediator. FIG. 1 shows anodic current dependence on glucose concentration (i.e., the current increases as the glucose concentration is increased). This test demonstrates the ability of the electrically conductive ink to oxidize glucose and produce electrical current. For reference a blank piece of Toray paper was also tested under the same conditions and showed no increase in current with adding glucose.

Example 2

In order to demonstrate power generation, the electrode described in Example 1 was combined with a Pt-based oxygen reduction cathode in a fuel cell test configuration. In this example, the electrically conductive ink was prepared using the same procedure as in Example 1 and then drop casted onto a carbon felt based electrode. This electrode was loaded into a custom designed polycarbonate based fuel cell test assembly as the anode side of the fuel cell. For the cathode side of the device a Pt-based half-MEA consisting of 0.5 mg/cm$^2$ Pt on a gas diffusion electrode hot pressed to a Nafion 117 membrane was used. The substrate (serving as the "fuel") comprised 50 mM glucose in 245 mM phosphate buffer solution with 10 mM hydroquinone used as a mediator to improve electron transport. Power generation was tested by placing the fuel cell under constant load and measuring the resultant voltage and current across that load.

The load was varied in steps from an open circuit condition (5 M-omhs) to a high electric loading condition (10 ohms). The maximum power was at ~500 ohms with a voltage of 0.3 V, current of 2.5 mA·cm$^{-2}$ and total power of 1 mW·cm$^{-2}$ as shown in FIGS. 2A and 2B.

Example 3

Figures 3A, 3B:
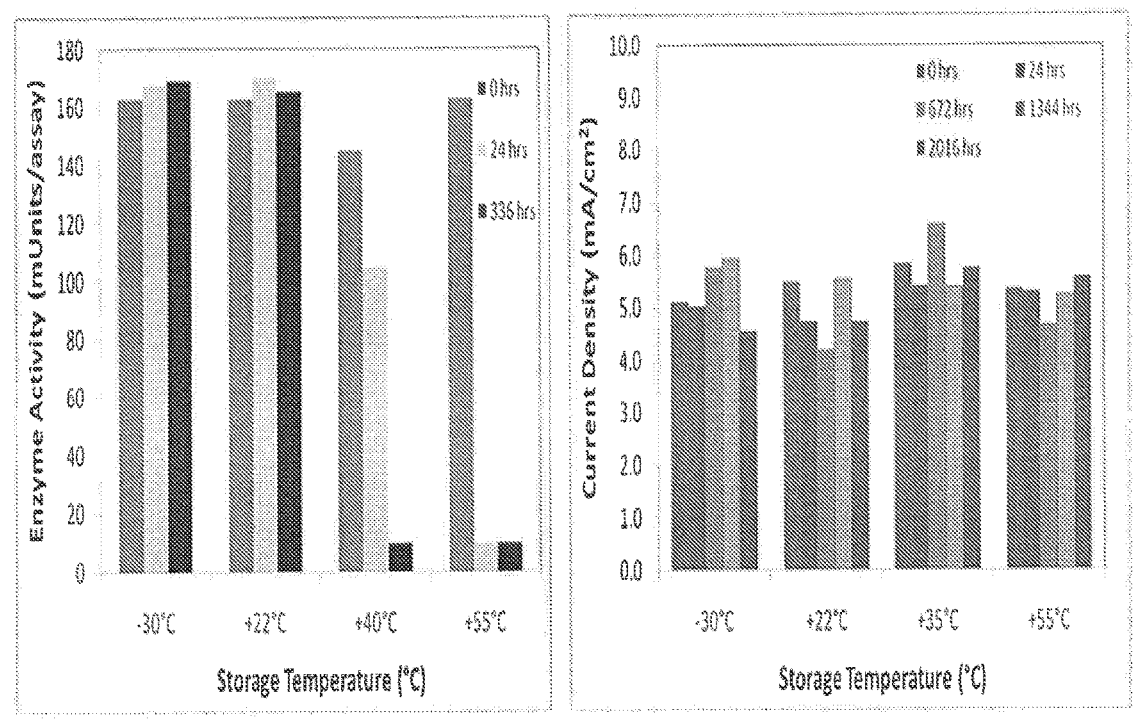
FIGS. 3A and 3B show the activity of the enzyme at increasing temperatures in free solution and electrical current produced for one embodiment of the ink used in a fuel cell.

In order to demonstrate the stability of the ink at elevated temperatures during storage, the ink was stored at elevated temperatures for extended periods of time. As a control experiment, the glucose oxidase enzyme was mixed in aqueous buffer solution and stored at temperatures of −30° C., +22° C., +40° C., and +55° C. A standard enzyme activity test (Megazyme) was used to measure the activity of the enzyme after various storage intervals. The results shown in FIG. 3A establish that the free enzyme lost enzymatic activity after 24 his at +40° C. and almost immediately at +55° C. As a comparison, testing was performed on electrodes prepared with the enzymatic ink process. The electrodes were created using the same electrode preparation and fuel cell test procedure described in Examples 1 and 2. Multiple electrodes were prepared and tested. Electrodes were then stored at temperatures of −30° C., +22° C., +35° C., +55° C., and +70° C. with three electrodes being stored at each condition. The electrodes were tested at periodic intervals up to 3 months. The electrical testing consisted of measurement of current density at a constant resistance of 10 Ohms. The electrical testing was used in lieu of the standard assay testing as the immobilized electrode was not compatible with standard assay techniques. However, the ability to generate electrical current is dependent of the enzymatic oxidation of the glucose substrate and is definitive evidence that the enzymes are still active. The results in FIG. 3B show significant current generation and no degradation in performance after storage of up to +55° C. The novel formulation of the electrically conductive ink of the present disclosure provides for stabilization of the enzymes contained therein and allows the electrically conductive ink to function at elevated temperatures.

Example 4

Figures 4A, 4B:
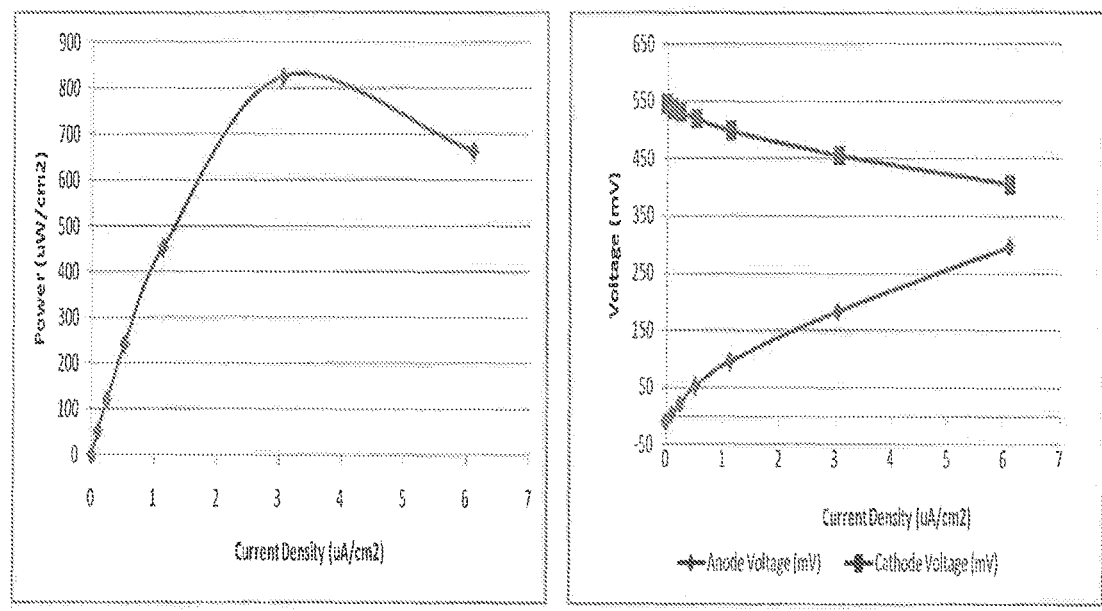
FIGS. 4A and 4B show the power curve of a cell and polarization curves of cathode and enzymatic anode with one embodiment of the ink in combination with a conductive polymer.

As shown in this example, in one embodiment adding a conductive polymer to the ink improves electrical conductivity and also improves mechanical stability and properties of ink layer. We added into the ink 1-30% by volume to the following pyrrole solution: 5-100 mM pyrrole with 10-500 mM LiClO$_4$ mixed in 20-300 mM PBS pH7. After deposition and before the anode testing, pyrrole monomer additive in the deposited ink layer is electrochemically polymerized for 5-50 seconds at +0.2-1.2 V vs. Ag/AgCl. Anodes fabricated with the addition of the conductive polymer (polypyrrole) were assembled into a fuel cell with air-breathing Pt cathode as described in Example 2. Results from this test are shown in FIGS. 4A and 4B showing >800 µW·cm$^{-2}$ at current >3 mA·cm$^{-2}$.

Example 5

Figures 5A, 5B:
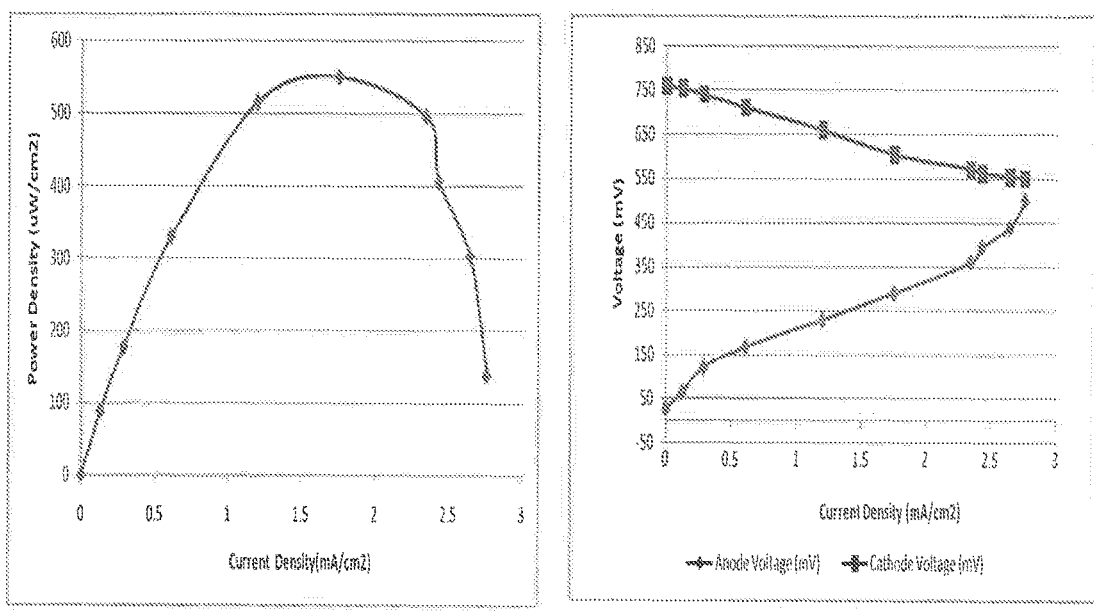
FIGS. 5A and 5B show the power curve of a cell and polarization curves of cathode and enzymatic anode with one embodiment of the ink in combination with a Tetrathiafulvalene (TTF) mediator.

As shown in this example, in one embodiment adding an electron mediator to the ink provides immobilized mediator. The specific mediator used in this example was TTF. A solution of TTF and acetone was mixed and the CNTs were dispersed in this solution. The TTF-CNT solution was centrifuged and decanted several times and then the supernatant solution was mixed with binding agent (PEI), enzyme (glucose oxidase), and cross-linkers (EDC and NHS) as before to make an ink solution. The ink solution was deposited on to a Toray Paper based electrode (anode) which was combined with Pt air-breathing cathode and FC hardware as described in Example 2. The incorporation of the TTF allows for the removal of the diffusive HQ mediator used in Example 2 and the fuel consisted strictly of glucose and buffer solution (50 mM glucose and 245 mM PBS). The test procedure was as described in Example 2. Results in FIGS. 5A and 5B clearly showed enzymatic activity and mediated electron transfer with immobilized mediator in the ink with power density of >500 µW·cm$^{-2}$ generated at current >1.5 mA·cm$^{-2}$.

Example 6

Figure 6:
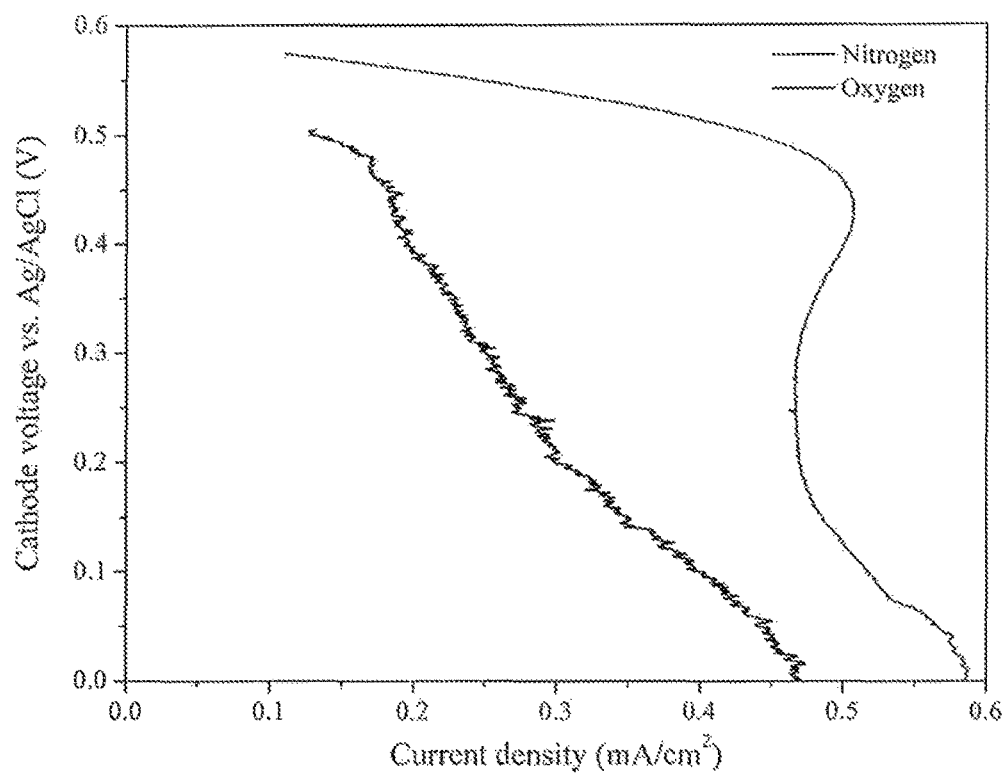
FIG. 6 shows one embodiment of the ink comprising the Lacasse enzyme for oxygen reduction and polarization curve of such electrode without and with presence of oxygen.

In one embodiment, the ink solution comprises enzyme lacasse. The ink of this example was prepared using the same protocol as described in Example 1 with the only difference being that the enzyme lacasse was substituted for glucose oxidase and provided biocatalyzed oxygen reduction. The electrode was then tested with a electrochemically technique of linear sweep voltammetry against platinum counter electrode in 245 mM PBS buffer pH 5.8 that was (1) degassed with nitrogen and (2) oxygen saturated. FIG. 6 indicates differences in the reduction current with and without oxygen presence in the buffer solution. It demonstrates that multiple enzymes are active in the electrode and operates in direct electron transfer. Typical voltage operation range of such cathode is 0.4 to 0.5 V vs. Ag/AgCl.

Example 7

This example shows that a battery comprising the ink of the present disclosure can be operated at elevated temperatures. A standard fuel cell was constructed using the glucose oxidase/ink modified anode of Example 1 and a Prussian Blue (PB) based cathode. Nafion membrane was used to separate the anodic and cathodic chambers. The anodic chamber was filled with fuel, as described in Example 2. Prior to filling the cell with fuel, both the fuel stock and the empty cell was placed in a +55° C. temperature controlled chamber for 15 minutes to come to operating temperature. The fuel was degassed with N$_2$ gas. After 15 minutes the cell was filled with fuel and left to continue equalization in the temperature controlled chamber for another 15 minutes. All testing was performed under the +55° C. operating conditions. Standard power curve and electrode polarization curves were measured on the cell as described in Example 2.

Figure 7A:
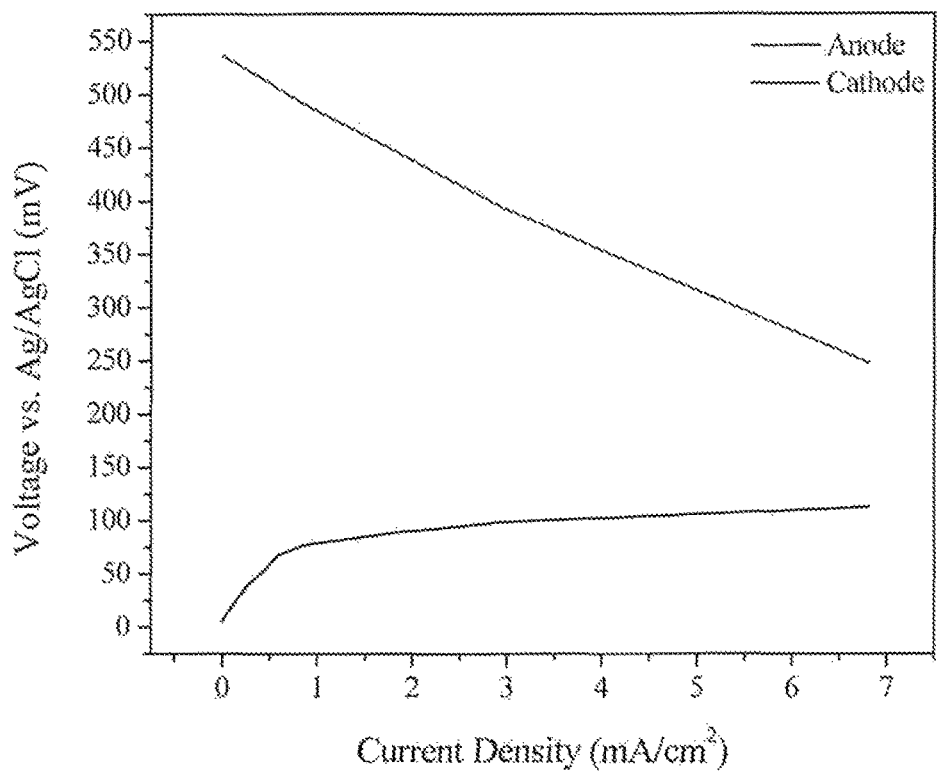
FIG. 7A shows polarization curves of the enzymatic anode of one embodiment of the ink when operated at 55 degrees Celsius; polarization curve for the cathode is also shown in FIG. 7B which shows power curve of such cell that is power density versus cell voltage.
Figure 7B:
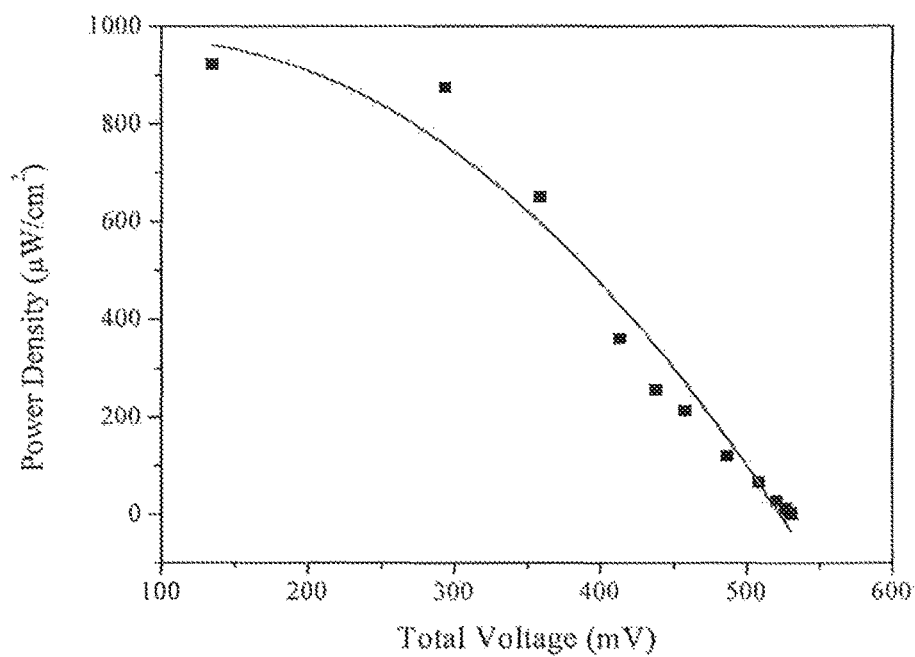

FIGS. 7A and 7B depict the polarization curves for the anode and cathode and power curve measured at elevated temperature of 55° C. The power curve in FIG. 7B shows a partial curve with the peak power density of 875 µW·cm$^{-2}$ reached at 295 mV. This value of the peak power is very comparable to those achieved at room (+25° C.) temperature, suggesting that the ink and batteries containing the ink are stable and perform at elevated temperatures than are known in the art.

Although particular embodiments of the present disclosure have been described, it is not intended that such references be construed as limitations upon the scope of this disclosure except as set forth in the claims.

We claim:
1. A method of manufacturing a thermostable polymer matrix for enzyme entrapment, said method comprising the steps of:
   a. providing and mixing, in the following order, (i) first a nano-scale conducting material; (ii) second a binding agent of polyethyleneiminie; (iii) third a cross-linker; and (iv) fourth an enzyme in a solution; and
   b. drying the solution,
   wherein the enzyme maintains at least 50% of its electrical conductivity and biocatalytic activity at temperatures up to 35 degrees Celsius as compared to 22 degrees Celsius.

2. The method of claim 1 wherein said enzyme maintains at least 75% of its electrical conductivity and biocatalytic activity at temperatures up to 55 degrees Celsius as compared to 22 degrees Celsius.

3. The method of claim 1 further comprising the step of providing at least one of a mediator and a substrate in step (a), wherein the mediator or the substrate are added before the enzyme in step (a)(iii).

4. The method of claim 3 wherein said mediator is selected from the group consisting of hydroquinone, other quinone containing compounds, ferrocene, ferricyanide, flavin adenine dinucleotide, nicotinamide adenine dinucleotide, pyrrolo-quinoline-quinone (PQQ), tetrathiafulvalene, a compound containing osmium and an azine compound.

5. The method of claim 1 wherein said nano-scale conducting material comprises a carbon nanotube.

6. The method of claim 5 wherein said carbon nanotube is selected from the group consisting of a single-wall carbon nanotube and a multi-wall carbon nanotube.

7. The method of claim 1 wherein said enzyme comprises at least one oxidoreductase enzyme capable of oxidizing a substrate.

8. The method of claim 7 wherein said oxidoreductase enzyme is selected from the group consisting of an oxidase, dehydrogenase and hydrogenase enzyme.

9. The method of claim 3 wherein said substrate is selected from the group consisting of glucose, fructose, sucrose, trehalose, glycerol, methanol, ethanol, ethylene glycol, diethylene glycol, polyethylene glycol, diol, cellulose, JP8 fuel, kerosene or a kerosene based compound, methane and butane.

10. A thermostable polymer matrix for enzyme entrapment, made by a process comprising the steps of:
   a. providing and mixing, in the following order, (i) first a nano-scale conducting material; (ii) second a binding agent of polyethyleneiminie; (iii) third a cross-linker; and (iv) fourth a first enzyme in a solution; and
   b. drying the solution,
   wherein the enzyme maintains at least 50% of its electrical conductivity and biocatalytic activity at temperatures up to 35 degrees Celsius as compared to 22 degrees Celsius.

11. The method of claim 10 wherein said enzyme maintains at least 75% of its electrical conductivity and biocatalytic activity at temperatures up to 55 degrees Celsius as compared to 22 degrees Celsius.

12. The method of claim 10 wherein step (a) further comprises adding at least one of a mediator, a cross-linking agent and a substrate to the solution, wherein the mediator, cross-linking agent or the substrate are added before the enzyme in step (a)(iii).

13. The method of claim 12 wherein said mediator is selected from the group consisting of hydroquinone, other quinone containing compounds, ferrocene, ferricyanide, flavin adenine dinucleotide, nicotinamide adenine dinucleotide, pyrrolo-quinoline-quinone (PQQ), tetrathiafulvalene and an azine compound.

14. The method of claim 10 wherein said nano-scale conducting material is selected from the group consisting of a single-wall carbon nanotube and a multi-wall carbon nanotube.

15. The method of claim 12 wherein said substrate is selected from the group consisting of glucose, fructose, sucrose, trehalose, glycerol, methanol, ethanol, ethylene glycol, diethylene glycol, polyethylene glycol, diol, cellulose, JP8 fuel, kerosene or a kerosene based compound, methane and butane.

16. The method of claim 10 further comprising adding a second enzyme to the solution after the addition of the first enzyme.

17. The method of claim 15 wherein either the first or second enzyme is selected from the group consisting of D-fructose-5-dehydrogenase, glucose dehydrogenase, alcohol dehydrogenase, gluconate 2-dehydrogenase, laccase, bilirubin oxidase, ascorbate oxidase, aldehyde dehydrogenase, oxalate oxidase, malate dehydrogenase, succinate dehydrogenase, pyruvate dehydrogenase, glutamate dehydrogenase, isocitrate dehydrogenase, glucose oxidase, lactate oxidase, alcohol oxidase, and lactate dehydrogenase.

18. The method of claim 16 further comprising adding at least a third enzyme to the solution after the addition of the second enzyme.

19. A method of manufacturing a thermostable polymer matrix for enzyme entrapment, said method comprising the steps of:
   a. providing and mixing at least one of (i) a nano-scale conducting material;
      (ii) a binding agent, wherein the binding agent is polyethyleneimine; or
      (iii) a cross-linker and the enzyme in a solution; and
   b. drying the solution,
   wherein the enzyme maintains at least 50% of its electrical conductivity and biocatalytic activity at temperatures up to 35 degrees Celsius as compared to 22 degrees Celsius.

20. The method of claim 19 wherein said enzyme maintains at least 75% of its electrical conductivity and biocatalytic activity at temperatures up to 55 degrees Celsius as compared to 22 degrees Celsius.

21. The method of claim 19 further comprising the step of providing at least one of a mediator and a substrate in step (a).

22. The method of claim 21 wherein said mediator is selected from the group consisting of hydroquinone, other quinone containing compounds, ferrocene, ferricyanide, flavin adenine dinucleotide, nicotinamide adenine dinucleotide, pyrrolo-quinoline-quinone (PQQ), tetrathiafulvalene, a compound containing osmium and an azine compound.

23. The method of claim 19 wherein said nano-scale conducting material comprises a carbon nanotube.

24. The method of claim 23 wherein said carbon nanotube is selected from the group consisting of a single-wall carbon nanotube and a multi-wall carbon nanotube.

25. The method of claim 19 wherein said enzyme comprises at least one oxidoreductase enzyme capable of oxidizing a substrate.

26. The method of claim 25 wherein said oxidoreductase enzyme is selected from the group consisting of an oxidase, dehydrogenase and hydrogenase enzyme.

27. The method of claim 21 wherein said substrate is selected from the group consisting of glucose, fructose, sucrose, trehalose, glycerol, methanol, ethanol, ethylene glycol, diethylene glycol, polyethylene glycol, diol, cellulose, JP8 fuel, kerosene or a kerosene based compound, methane and butane.

\* \* \* \* \*